(12) United States Patent
Murray

(10) Patent No.: US 8,955,628 B2
(45) Date of Patent: Feb. 17, 2015

(54) COOLING ARRANGEMENTS FOR VEHICLES

(75) Inventor: Ian Gordon Murray, Puttenham (GB)

(73) Assignee: Gordon Murray Design Limited, Shalford (GB)

( * ) Notice: Subject to any disclaimer, the term of this patent is extended or adjusted under 35 U.S.C. 154(b) by 239 days.

(21) Appl. No.: 13/515,674

(22) PCT Filed: Dec. 17, 2010

(86) PCT No.: PCT/GB2010/002289
§ 371 (c)(1),
(2), (4) Date: Aug. 2, 2012

(87) PCT Pub. No.: WO2011/073625
PCT Pub. Date: Jun. 23, 2011

(65) Prior Publication Data
US 2012/0292121 A1  Nov. 22, 2012

(30) Foreign Application Priority Data

Dec. 17, 2009  (GB) .................................. 0922094.8

(51) Int. Cl.
*B60K 11/04* (2006.01)
*B60K 11/08* (2006.01)

(52) U.S. Cl.
CPC ................. *B60K 11/04* (2013.01); *B60K 11/08* (2013.01)
USPC ....................................................... 180/68.1

(58) Field of Classification Search
CPC ........ B60K 11/02; B60K 11/04; B60K 11/08; B62D 35/02; F01P 11/10
USPC .................. 180/68.1, 68.3, 68.4, 69.2, 69.21, 180/69.23, 69.24, 69.25, 89.2, 296, 309; 165/41, 51, 122; 296/193.09, 193.1; 123/41.01, 41.65, 41.71
See application file for complete search history.

(56) References Cited

U.S. PATENT DOCUMENTS 1,648,505 A * 11/1927 Persu ......................... 296/181.5
1,882,319 A * 10/1932 Gurney ....................... 180/68.1
(Continued)

FOREIGN PATENT DOCUMENTS

| CH | 233331 A | 7/1944 |
| DE | 4330044 | 3/1995 |

(Continued)

OTHER PUBLICATIONS

PCT International Search Report, Jan. 6, 2011.
(Continued)

*Primary Examiner* — J. Allen Shriver
*Assistant Examiner* — Brodie Follman
(74) *Attorney, Agent, or Firm* — Westman, Champlin & Koehler, P.A.; Z. Peter Sawicki; Amanda M. Prose

(57) ABSTRACT

A vehicle comprises front and rear wheels, a passenger cell, and an engine, wherein the engine is located entirely aft of the foremost extent of the passenger cell, the engine having a cooling circuit, further comprising a radiator that is in fluid communication with the cooling circuit, the radiator being located aft of the front wheel centers and in front of the engine, and in an airflow path that extends from an underside of the vehicle to an exit on a rear face of the vehicle, wherein the airflow path is ducted at least in a portion around the radiator. This arrangement succeeds in placing the radiator close to the engine, thereby avoiding long conduit paths and their associated weight. The ducting causes a region of high pressure on the face of the radiator, and the exit on the rear face of the vehicle opens into the low pressure region behind the vehicle, so that air is drawn along the flow path, through the radiator.

13 Claims, 1 Drawing Sheet

(56) References Cited

U.S. PATENT DOCUMENTS

| | | | | |
|---|---|---|---|---|
| 1,934,191 | A * | 11/1933 | Hoffman | 180/69.6 |
| 1,979,191 | A * | 10/1934 | Burney | 180/68.1 |
| 2,033,731 | A * | 3/1936 | Nallinger | 180/68.3 |
| 2,126,589 | A * | 8/1938 | Turner | 180/305 |
| 2,143,889 | A * | 1/1939 | Ledwinka | 180/68.1 |
| 2,197,503 | A * | 4/1940 | Martin | 123/198 E |
| 2,204,926 | A * | 6/1940 | Clingerman | 180/68.1 |
| 2,242,494 | A * | 5/1941 | Wolf | 180/68.1 |
| 2,581,072 | A * | 1/1952 | Brezek | 180/68.1 |
| 2,855,064 | A * | 10/1958 | McCullough | 180/291 |
| 3,179,197 | A | 4/1965 | Peres | |
| 3,205,964 | A * | 9/1965 | Henry-Biabaud | 180/68.1 |
| 3,774,710 | A * | 11/1973 | Gustavsson | 180/68.1 |
| 3,791,471 | A * | 2/1974 | Buser | 180/68.1 |
| 3,906,740 | A * | 9/1975 | Thomas | 62/239 |
| 3,933,136 | A * | 1/1976 | Burst | 123/41.58 |
| 4,109,956 | A * | 8/1978 | Roman | 296/77.1 |
| 4,304,314 | A * | 12/1981 | Sakaguchi et al. | 180/68.2 |
| 4,681,178 | A * | 7/1987 | Brown | 180/68.3 |
| 4,690,204 | A * | 9/1987 | Reichel et al. | 165/44 |
| 4,805,747 | A * | 2/1989 | Moedinger et al. | 188/264 A |
| 4,828,017 | A * | 5/1989 | Watanabe et al. | 165/41 |
| 4,854,278 | A * | 8/1989 | Honecker | 123/198 E |
| 4,915,192 | A * | 4/1990 | Hayashida et al. | 180/309 |
| 4,966,408 | A * | 10/1990 | Yura | 296/181.5 |
| 5,042,870 | A * | 8/1991 | Yura | 296/180.1 |
| 5,193,608 | A * | 3/1993 | Sekine et al. | 165/41 |
| 5,322,340 | A * | 6/1994 | Sato et al. | 296/180.1 |
| 5,476,138 | A * | 12/1995 | Iwasaki et al. | 165/41 |
| 5,551,505 | A * | 9/1996 | Freeland | 165/41 |
| 5,832,862 | A * | 11/1998 | Hulten | 440/12.5 |
| 6,068,046 | A * | 5/2000 | Pommier et al. | 165/42 |
| 6,443,253 | B1 * | 9/2002 | Whitehead et al. | 180/68.1 |
| 6,685,256 | B1 * | 2/2004 | Shermer | 296/180.4 |
| 7,096,986 | B2 * | 8/2006 | Borroni-Bird et al. | 180/68.1 |
| 7,163,073 | B2 * | 1/2007 | Schmid et al. | 180/68.3 |
| 7,270,206 | B2 * | 9/2007 | Guertler | 180/68.1 |
| 7,328,764 | B2 * | 2/2008 | Penz | 180/68.6 |
| 8,360,187 | B2 * | 1/2013 | Hirota et al. | 180/68.1 |
| 8,544,583 | B2 * | 10/2013 | Ajisaka | 180/68.1 |
| 8,550,530 | B2 * | 10/2013 | Murray | 296/64 |
| 8,672,067 | B2 * | 3/2014 | Ajisaka | 180/65.21 |
| 2003/0183432 | A1 * | 10/2003 | Suzuki | 180/68.1 |
| 2005/0051372 | A1 * | 3/2005 | Guertler | 180/68.1 |
| 2005/0272324 | A1 * | 12/2005 | Gibbs | 440/88 C |
| 2006/0238001 | A1 * | 10/2006 | Konermann et al. | 296/205 |
| 2007/0209779 | A1 * | 9/2007 | Shinmura et al. | 165/42 |
| 2007/0215400 | A1 * | 9/2007 | Kurtz et al. | 180/68.6 |
| 2008/0190678 | A1 * | 8/2008 | Penz | 180/68.4 |
| 2011/0284298 | A1 * | 11/2011 | Ajisaka | 180/65.21 |
| 2012/0024611 | A1 * | 2/2012 | Ajisaka | 180/68.1 |
| 2012/0153681 | A1 * | 6/2012 | Ajisaka | 296/208 |
| 2012/0292121 | A1 * | 11/2012 | Murray | 180/68.1 |
| 2013/0026797 | A1 * | 1/2013 | Onodera et al. | 296/204 |
| 2013/0059519 | A1 * | 3/2013 | Tajima et al. | 454/152 |

FOREIGN PATENT DOCUMENTS

| | | | |
|---|---|---|---|
| GB | 204849 | A | 10/1923 |
| GB | 390582 | | 4/1933 |
| GB | 432718 | | 8/1935 |
| JP | 61146635 | A | 7/1986 |
| JP | 03125631 | A * | 5/1991 ............. B60K 11/04 |

OTHER PUBLICATIONS

PCT Written Opinion, Jan. 6, 2011.

* cited by examiner

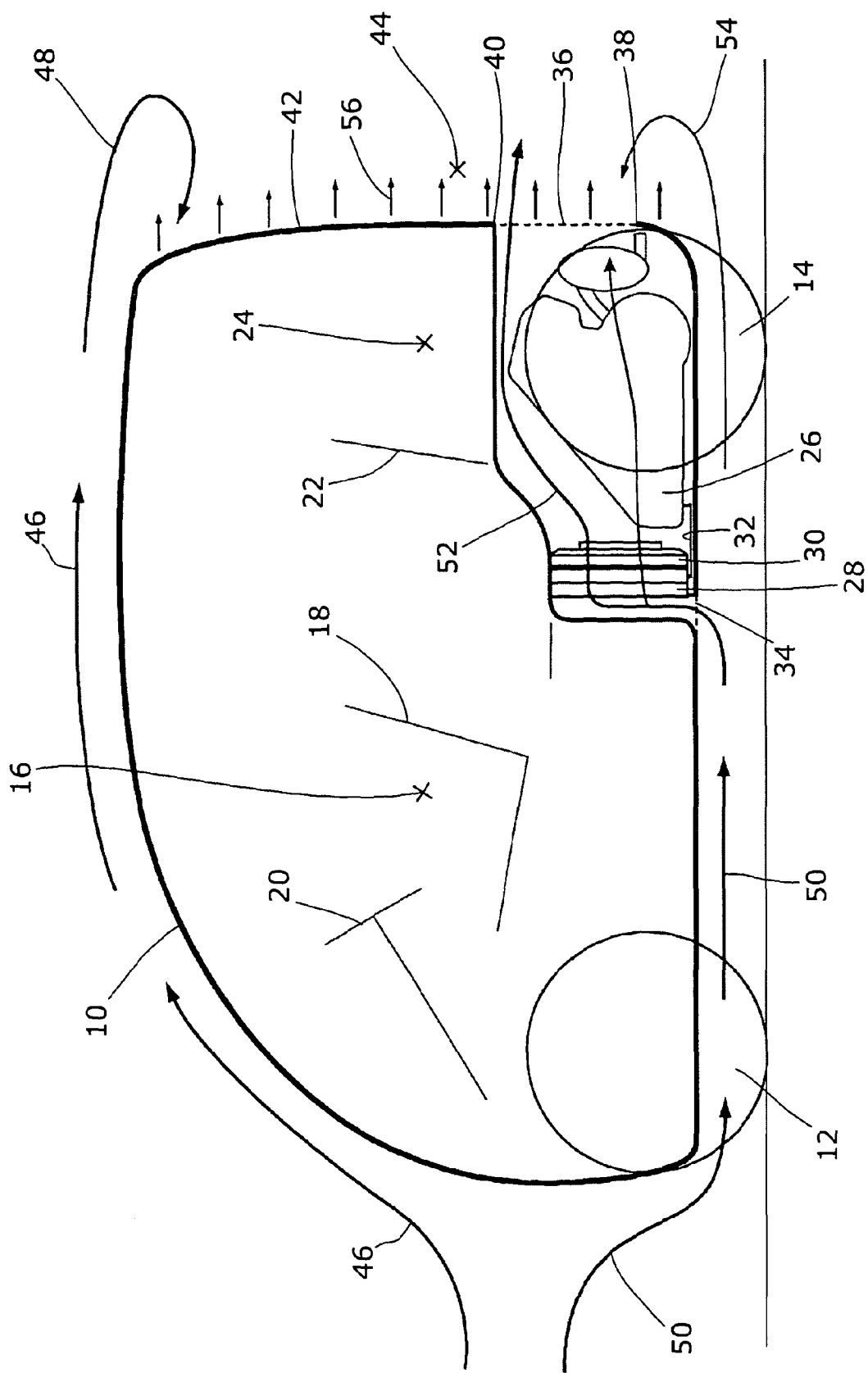

COOLING ARRANGEMENTS FOR VEHICLES

CROSS-REFERENCE TO RELATED APPLICATION

This application is a Section 371 National Stage Application of International Application No. PCT/GB2010/002289, filed Dec. 17, 2010 and published as WO2011/073625 on Jun. 23, 2011, the content of which is hereby incorporated by reference in its entirety.

FIELD OF THE INVENTION

The present invention relates to improvements in or relating to vehicles, and especially to the cooling of mid- and rear-engined vehicles.

BACKGROUND

Many and various layouts have been adopted for vehicles and their drivetrains. The principal distinctions lie in the selection of which wheels are driven, and the location of the engine and gearbox that drive those wheels. The most common layout is front-engined, in which the engine is located forward of the passenger cell. However, for reasons of packaging and weight distribution it is also known to adopt a mid-engined layout or a rear-engined layout. A rear-engined layout, such as that adopted in the VW Beetle and the Porsche 911, places the engine over or behind the rear axle. A mid-engined layout places the engine between the rear axle and the passenger cell, and is often employed in sports cars and supercars such as the Lotus Elise, Porsche Boxster and Carrera GT, the Ferrari 430, and the Lamborghini Gallardo (for example).

The engine of any vehicle must be cooled, wherever it is located. In front-engined vehicles, this is usually achieved by placing a radiator behind a grille on the front face of the vehicle. As the vehicle moves forward, cold air flows through the grille and through the radiator. Meanwhile, a heat transfer fluid is pumped around a circuit that includes the engine and the radiator. The fluid is therefore cooled by the air flowing through the radiator, and (in turn) cools the engine through which it flows.

Rear- and mid-engined vehicles typically use essentially the same arrangement, extending the conduits to and from the radiator as necessary in order to reach the engine. Some early rear-engined vehicles (such as the early Beetle and 911 variants) dispensed entirely with forced cooling arrangements, and instead ducted air flowing over the roof of the vehicle into the engine bay and over cooling fins built into the engine block and/or cylinders, thereby air-cooling the engine.

The heat transfer fluid is usually water-based (i.e. water containing various additives, such as to inhibit freezing and corrosion). Other fluids may be used however, such as the Porsche 911 (type 993) which employed the lubricating oil as the heat transfer fluid.

SUMMARY OF THE INVENTION

The present invention relates to mid- and rear-engined vehicles, and seeks to improve on the cooling arrangements for the engines of such vehicles. It is applicable to any such vehicle, regardless of the location of the gearbox and the configuration of the driven wheels, but the advantages of the invention are particularly complemented by a rear-engined, rear-wheel drive configuration.

The present invention therefore provides a vehicle comprising front and rear wheels, a passenger cell, and an engine, wherein the engine is located entirely aft of the foremost extent of the passenger cell, the engine having a cooling circuit, further comprising a radiator that is in fluid communication with the cooling circuit, the radiator being located aft of the front wheel centres and in front of the engine, and in an airflow path that extends from an underside of the vehicle to an exit on a rear face of the vehicle, wherein the airflow path is ducted at least in a portion around the radiator, This arrangement succeeds in allowing the radiator to be placed close to the engine, thereby avoiding long conduit paths and their associated weight. It also reduces the range of items that need to be accommodated in front of the passenger cell, allowing greater flexibility in the vehicle packaging and hence its overall design. However, it also ensures an adequate airflow through the radiator, the usual reason for placing the radiator on the front face of the vehicle. The ducting in the region around the radiator creates an area of high pressure on the front face of the radiator as the vehicle moves through the air. In addition, locating the exit on the rear face of the vehicle means that it opens into the low pressure region that is created behind the vehicle as it moves through the air. This combination therefore draws air along the flow path, through the radiator.

The flow path can be partially or fully ducted, and/or or it can be defined between other items such as the underside of the passenger cell and an upper surface of the engine.

The rear face of the vehicle is preferably upright, as is common in the case of city cars. This emphasises the low pressure area and ensures an adequate airflow. The exit is preferably located on the rear face at a height such that at least part of the exit is above the rear wheel centres, to place it at a position where the air pressure differential is sufficient. The exit can be covered with a grille, or the like.

A fan can be provided, associated with the radiator, for urging air through the radiator. This will assist when the vehicle is at low speeds or stationary.

A pump is preferably present, to urge coolant fluid around the cooling circuit. The coolant fluid is ideally water-based.

BRIEF DESCRIPTION OF THE DRAWINGS

An embodiment of the present invention will now be described by way of example, with reference to the accompanying figures in which; FIG. 1 shows a longitudinal sectional view of a rear-engined vehicle according to the present invention.

DETAILED DESCRIPTION OF THE EMBODIMENTS

Referring to FIG. 1, a vehicle 10 in the form of a compact city car includes front wheels 12, rear wheels 14, and a passenger cell 16. Within the passenger cell 16, one or more front seats 18 are provided, together with controls 20 to allow a driver to control the vehicle. The controls 20 are shown in the form of a steering wheel but will of course include the usual set of controls that are conventionally provided in a city car, such as the accelerator (gas), brake and clutch pedals and a gearstick. The clutch pedal and the gearstick may be replaced with other transmission controls as required. Behind the front seat(s) there are one or more rear seats 22, and behind the rear seat(s) 22 is a luggage compartment 24. In combination, the space occupied by the front seat(s) 18 and the rear seats(s) 22 defines the passenger cell 16. In this case, the luggage compartment 24 is integral with the passenger cell 16, to maximise the flexibility of the internal space, but this need not be the case.

An engine 26 is provided beneath the rear seat(s) 22 and the luggage compartment 24. This may be of any type that requires cooling, such as a petrol engine, a diesel engine, an electric motor, an alternative-fuel engine, or a hybrid, of any of these (or other) forms of propulsion. Located between the rear wheels 14, the engine has an associated transmission and drive shafts, and is able to drive the rear wheels directly. The invention is applicable to vehicles with other forms of transmission, however.

Immediately in front of the engine 26, there is a radiator 28 and an associated fan 20. Sited close to the engine 26, the radiator can be connected to the engine's cooling circuit using only short lengths of hose 32. Compared to the length of hose (and volume of coolant fluid) required to locate the radiator at the front of the vehicle, there is a significant weight saving in locating the radiator in this position. In addition, the front grille that is required in order to allow ingress of air for the radiator would usually create a significant contribution to the drag coefficient of the vehicle. This grille can be eliminated, or greatly reduced in size, thereby reducing drag and allowing the operating efficiency of the vehicle to be improved.

It remains necessary, of course, to ensure an adequate airflow through the radiator. The vehicle illustrated therefore has an inlet grille 34 on the underside of the vehicle immediately ahead of the radiator 28 and an exit grille 36 on the rear face 42 of the vehicle, extending from a lower edge 38 just above the base of the vehicle to an upper edge 40 just below the luggage compartment, and above the rear axle. This positioning of the exit grille 36 places it in communication with the region of low pressure air ("base suction") that exists behind a moving vehicle—especially one with an upright rear face 42 as illustrated in FIG. 1.

Ducting can be provided for the airflow over the radiator. This could be over the entire length of the airflow, or (preferably) around the radiator and fan only. For example, such ducting could extend from a scoop protruding below the vehicle to a point just aft of the fan. The ducting between the underside of the vehicle and the radiator 28 may be unobstructed and fully sealed, directing airflow directly onto the forward face of the radiator 28, i.e. the forward face of the radiator is oriented transverse to the airflow path. By expanding the cross-sectional area of the duct in the region leading up to the radiator, a very high and evenly distributed positive pressure can be achieved on the forward face of the radiator 28. The low pressure area 44 behind the vehicle is created by the slipstream resulting from the air flowing past the vehicle when in motion. Air flows over the vehicle as shown by arrows 46, and when the airflow reaches the rear of a vehicle with a bluff rear face 42 there is a turbulent flow 48 into the space immediately behind the vehicle. Likewise, there is an air flow beneath the vehicle (arrows 50); some of this will be diverted through the radiator as described above (arrow 52) but some (arrow 54) will continue under the vehicle and flow turbulently into the space behind the vehicle. This turbulent region behind the vehicle is normally seen as a problem; the low pressure region 44 that it creates acts to increase the aerodynamic drag of the vehicle (arrows 56), and the turbulence can pick up dirt and water to render the rear faces of (especially) estate or station wagon vehicles very dirty.

In the present invention, however, this low pressure region 44 is positively advantageous. It will provide a pressure differential between the inlet grill 34 and the exit grille 36 which will cause an airflow through the radiator 28, providing the necessary cooling. This can of course be assisted by the fan 30, such as when the vehicle is stationary or at low speed, or when the engine is under particular strain, in the manner that is familiar to vehicle designers. However, much of the airflow through the radiator will be provided by this use of the base suction effect.

The positive pressure achieved on the forward face of the radiator 28, when combined with the low base suction at the rear of the vehicle 10, results in much higher pressure drops across the radiator than can otherwise normally be achieved with base suction or a vacuum assisted rear exit alone. It is the combination of positive pressure on the forward face of the radiator 28 and negative pressure on the rearward face 42 of the vehicle 10 that results in a strong performance gain in radiator air flow.

Thus, the invention offers a number of advantages when employed with a mid- or rear-engined vehicle such as that illustrated. The significant weight of the conduits leading to a front-mounted radiator, is avoided, as is the weight of the coolant fluid with which the conduits will need to be filled and the various joints, fixings and attachments that are associated with the conduits. There will also be a cost saving associated with the absence of these items, and less time will be required during assembly of the vehicle. Indeed, the entire engine, gearbox and cooling system could be manufactured in one unit prior to fitting to the vehicle, offering greater efficiencies during manufacture.

In addition, the aerodynamic drag from the front grille can be eliminated entirely, offering an improved drag coefficient and hence greater efficiency from the vehicle. In use, the radiator will be less susceptible to damage, such as from collisions or from stones. An airflow over the engine is also created, assisting with cooling of the engine bay and preventing localised hot regions from developing.

It will of course be understood that many variations may be made to the above-described embodiment without departing from the scope of the present invention.

The invention claimed is:

1. A vehicle comprising front and rear wheels, a passenger cell, and an engine, wherein the engine is located entirely aft of the foremost extent of the passenger cell, the engine having a cooling circuit, further comprising a radiator that is in fluid communication with the cooling circuit, the radiator being located aft of the front wheel centers and in front of the engine, and in an airflow path that extends from an underside of the vehicle to an exit on a rear face of the vehicle, the airflow path being ducted at least in a portion around the radiator and the engine, wherein the airflow path is a single stream of air introduced vertically through a bottom opening at the underside of the vehicle, communicates with the radiator, and exits horizontally at the rear face of the vehicle.

2. The vehicle according to claim 1 in which the rear face of the vehicle is upright.

3. The vehicle according to claim 1 in which the exit is located on the rear face at a height such that at least part of the exit is above the rear wheel centers.

4. The vehicle according to claim 3 in which the exit is covered with a grille.

5. The vehicle according to claim 1 further comprising a fan associated with the radiator for urging air through the radiator.

6. The vehicle according to claim 1 further comprising a pump for urging coolant fluid around the cooling circuit.

7. The vehicle according to claim 6 in which the coolant fluid is water-based.

8. The vehicle according to claim 1 wherein the entirety of the airflow path is defined by ducting.

9. The vehicle according to claim 1 wherein the airflow path is ducted onto a front face of the radiator.

10. The vehicle according to claim 9, wherein the front face of the radiator is oriented transverse to the airflow path.

11. The vehicle according to claim 9 wherein the ducting is arranged to establish a region of positive pressure on the front face of the radiator when the vehicle is moving.

12. The vehicle according to claim 11, wherein said positive pressure is evenly distributed over said front face of the radiator.

13. The vehicle according to claim 1 wherein the ducting is fully sealed.

* * * * *